US012651721B2

(12) United States Patent　　　　(10) Patent No.:　US 12,651,721 B2

Dubrosky　　　　　　　　　　　　(45) Date of Patent:　Jun. 9, 2026

(54) THERMALLY INDICATIVE ELECTRICAL INSULATORS

(71) Applicant: ABB SCHWEIZ AG, Baden (CH)

(72) Inventor: Justin D. Dubrosky, Bloomfield, CT (US)

( * ) Notice: Subject to any disclaimer, the term of this patent is extended or adjusted under 35 U.S.C. 154(b) by 233 days.

(21) Appl. No.: 18/650,946

(22) Filed: Apr. 30, 2024

(65) Prior Publication Data

US 2025/0336631 A1　　Oct. 30, 2025

(51) Int. Cl.
H01H 71/04　　　(2006.01)
G01K 11/16　　　(2021.01)
H01B 3/30　　　(2006.01)

(52) U.S. Cl.
CPC ............. H01H 71/04 (2013.01); G01K 11/16 (2013.01); H01B 3/30 (2013.01); *H01H 2071/048* (2013.01)

(58) Field of Classification Search
CPC ..................................................... H01H 71/04
See application file for complete search history.

(56)　　　　　　References Cited

U.S. PATENT DOCUMENTS

| | | | | | |
|---|---|---|---|---|---|
| 7,812,704 | B2 * | 10/2010 | Darr | ...................... | G01K 11/12 |
| | | | | | 324/507 |
| 11,587,469 | B2 * | 2/2023 | Jaap | ...................... | H01H 71/06 |
| 2012/0223801 | A1 * | 9/2012 | Moon | ................ | H01H 85/0417 |
| | | | | | 337/265 |
| 2013/0328657 | A1 * | 12/2013 | Broghammer | ......... | H01H 71/04 |
| | | | | | 337/79 |
| 2023/0194360 | A1 * | 6/2023 | Legendre | ............... | G01K 3/005 |
| | | | | | 374/162 |

* cited by examiner

*Primary Examiner* — Alexander Talpalatski

(57)　　　　　　　ABSTRACT

An electrical protection device includes a housing including a plurality of sidewalls. The plurality of sidewalls includes one or more thermochromic sidewalls. The electrical protection device includes a switch assembly located in the housing and an electrical connector extending from the housing. The electrical connector is configured to place the switch assembly in electrical connection with a main bus at an electrical distribution panel. In response to a condition at the electrical protection device causing a temperature of a respective thermochromic sidewall of the one or more thermochromic sidewalls to exceed a temperature threshold, the respective thermochromic sidewall is configured to provide an indication of the condition of the electrical protection device. The indication may be a visual indication including a color change and an expansion of the material. The indication may be an audible indication including emitting a noise.

20 Claims, 8 Drawing Sheets

THERMALLY INDICATIVE ELECTRICAL INSULATORS

FIELD

The present disclosure relates to the field of electrical power distribution. More particularly, to thermally indicative insulators for electrical power distribution equipment.

BACKGROUND

Electrical power distribution systems can be utilized to supply electrical power to electronic devices in electrical connection with the system at respective feeder lines. The electronic devices can be connected to the system at, for example, an electrical distribution panel, so that power from a main bus can be supplied to the respective feeder lines and to the electronic devices connected thereto. Electrical protection devices can be installed in the system for fault isolation and to protect the connected electronic devices from damage caused by the fault. For example, each respective feeder line can include a circuit breaker to provide electrical fault current protection. If an electrical fault is detected, the protection device can switch open to protect the connected electronic devices.

SUMMARY

In some embodiments, a circuit breaker assembly includes a housing including a plurality of sidewalls, the plurality of sidewalls includes one or more thermochromic sidewalls, a switch assembly located in the housing, and an electrical connector extending from the housing, the electrical connector being configured to place the switch assembly in electrical connection with a main bus at an electrical distribution panel. In some embodiments, in response to a condition at the circuit breaker assembly causing a temperature of a respective thermochromic sidewall of the one or more thermochromic sidewalls to exceed a temperature threshold, the respective thermochromic sidewall is configured to provide an indication of the condition of the circuit breaker assembly.

In some embodiments, at least a portion of the respective thermochromic sidewall is configured to transition between a first color and a second color based on the temperature of the respective thermochromic sidewall relative to the temperature threshold.

In some embodiments, the respective thermochromic sidewall is the first color when the temperature is below the temperature threshold.

In some embodiments, the respective thermochromic sidewall transitions from the first color to the second color in response to the temperature of the respective thermochromic sidewall exceeding the temperature threshold.

In some embodiments, the one or more thermochromic sidewalls are arranged on the housing so as to be observable when the circuit breaker assembly is installed into the electrical distribution panel.

In some embodiments, the condition indicated by the respective thermochromic sidewall is due to a temperature in an interior region of the circuit breaker assembly increasing from thermal convection of heat produced by one or more electrical components in the circuit breaker assembly.

In some embodiments, the condition indicated by the respective thermochromic sidewall is an electrical fault in an electrical distribution system in electrical connection with the circuit breaker assembly.

In some embodiments, the one or more thermochromic sidewalls are not directly contacting an electrical component generating heat in the circuit breaker assembly.

In some embodiments, the plurality of sidewalls includes a polymeric material.

In some embodiments, the one or more thermochromic sidewalls further includes a thermochromic additive mixed with the polymeric material.

In some embodiments, the housing includes a first housing member, and a second housing member.

In some embodiments, the second housing member includes the one or more thermochromic sidewalls.

In some embodiments, the electrical connector includes a plurality of electrical connectors, each electrical connector of the plurality of electrical connectors connecting the switch assembly to a respective phase at the electrical distribution panel.

In some embodiments, an electrical device includes a housing including a plurality of sidewalls, the plurality of sidewalls includes at least one thermally indicative sidewall, and a switch assembly including one or more electrical connectors configured to place the switch assembly in electrical connection with a respective phase of a main bus of an electrical distribution panel. In some embodiments, in response to a condition at the electrical device causing a temperature of the at least one thermally indicative sidewall to exceed a temperature threshold, the at least one thermally indicative sidewall is configured to provide an indication of the condition.

In some embodiments, the at least one thermally indicative sidewall is arranged at the housing so as to be observable when the electrical device is installed into the electrical distribution panel. In some embodiments, the condition indicated by the at least one thermally indicative sidewall is due to a temperature in an interior region of the electrical device increasing from thermal convection of heat produced by one or more electrical components in the electrical device.

In some embodiments, the indication includes the at least one thermally indicative sidewall being a first color when the temperature is below the temperature threshold, and the at least one thermally indicative sidewall transitioning from the first color to a second color in response to the temperature of the at least one thermally indicative sidewall exceeding the temperature threshold.

In some embodiments, the indication further includes the at least one thermally indicative sidewall expanding in response to the temperature of the at least one thermally indicative sidewall exceeding the temperature threshold.

In some embodiments, the indication further includes the at least one thermally indicative sidewall emitting a noise in response to the temperature of the at least one thermally indicative sidewall exceeding the temperature threshold.

In some embodiments, the condition indicated by the at least one thermally indicative sidewall is due to a temperature in an interior region of the electrical device increasing from thermal convection of heat produced by one or more components in the electrical device.

In some embodiments, the at least one thermally indicative sidewall is not directly contacting an electrical component generating the heat in the electrical device.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure can be practiced.

DETAILED DESCRIPTION

Figure 1:
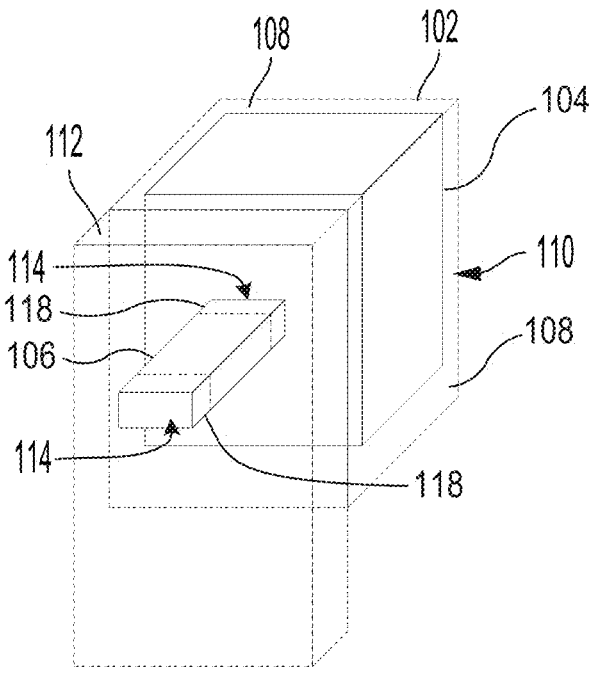
FIG. 1 is a perspective view of an electrical device, according to some embodiments.

Electrical distribution equipment is typically serviced at regular intervals to ensure proper functionality. Thermal measurement of the electrical distribution equipment can be taken using measuring equipment such as, for example, a temperature probe. While these preventative measures aim to detect electrical issues before they pose a threat to the electrical power system or the connected electrical load devices connected to the system, such preventative measures oftentimes require special authorization and/or tools. In addition, these approaches can require that the electrical equipment be shut off or put in an isolated condition prior to performing the maintenance.

In an electrical power distribution system, electrical issues at the system can stem from a variety of causes including, but not limited to, ground faults, arc faults, overcurrent faults, electrical component failure, and the like. For example, degradation of a component in an electrical protection device can cause a temperature of the component to increase until the electrical protection device fails, the increasing temperature contributing to the progressive degradation of the component. In another example, an electric fault current in the system can cause a temperature of the electrical connector connecting the electrical protection device to the main supply bus to increase. For example, the temperature of the electrical connector can increase over a normal operating temperature by a range of 50° C. to 65° C. due to an electrical fault in the system.

Various embodiments of the present disclosure relate to systems, devices, and apparatuses for providing thermally indicative electrical insulators. The thermally indicative electrical insulator can also be referred to herein as thermally indicative insulators, electrical insulators, and insulators. The thermally indicative electrical insulators can be utilized in various devices or assemblies of an electrical power distribution system, according to some embodiments. In some embodiments, the thermally indicative electrical insulators can be utilized in various devices or assemblies associated with the electrical power distribution system. For example, a circuit breaker assembly installed into the electrical power distribution system can include a housing including the thermally indicative electrical insulators.

The thermally indicative electrical insulators is configured to provide an indication observable by a user. The indications corresponding to a temperature of the thermally indicative electrical insulator. In some embodiments, the indication can be a result of the temperature of the thermally indicative electrical insulator exceeding the temperature threshold (e.g., thermal limit). The thermally indicative electrical insulator provides a distinctive indication to the user or observer when the temperature of the thermally indicative electrical insulator, or a portion thereof, exceeds the temperature threshold.

The thermally indicative electrical insulator can be made of one or more base materials and can include one or more additive materials configured to provide the indication when a temperature of the thermally indicative electrical insulator is exceeding a temperature threshold.

The resulting thermally indicative electrical insulator can provide a visual indication, an audible indication, or both, according to various embodiments. In some embodiments, the resulting thermally indicative electrical insulator can include a thermochromic material configured to provide a visual indication in the form of a color transition. In some embodiments, the resulting thermally indicative electrical insulator can include materials configured to provide a visual indication in the form of a shape change. For example, the thermally indicative electrical insulator can bulge or swell in response to a temperature of the thermally indicative electrical insulator exceeding the temperature threshold. In some embodiments, the resulting thermally indicative electrical insulator can include materials configured to provide an audible indication in the form of emitting a certain noise by the thermally indicative electrical insulator.

The resulting thermally indicative electrical insulators thereby provide a real-time indication that the temperature at a thermally indicative electrical insulator has exceeded a temperature threshold, and which may also be indicative of a temperature in the electrical device exceeding a respective threshold limit. That is, as the temperature inside the electrical device increases such as, for example, due to one or more components in the device increasing because of an electrical fault in the electrical power distribution system, the temperature of the thermally indicative electrical insulator also increases due to thermal convection, thermal conduction, or both.

The resulting thermally indicative electrical insulators can provide a distinctive indication at the device of a potential electrical fault at the device, the distribution panel, the electrical power distribution system, or any combinations thereof, that can be observed by the user or operator. The resulting thermally indicative electrical insulators thereby improves the operation of these systems by providing improved detection of fault events, providing early detection capabilities, eliminating a need to utilize measurement tools such as temperature probes or thermal imaging equipment to determine the temperature at the electrical device, and other like benefits. The thermally indicative electrical insulators can thereby improve a likelihood of detection of potential fault events in the system and can help mitigate a likelihood of causing damage to connected electronic devices due to the electrical fault. By enabling the detection of fault events due to increasing temperatures, early detection of electrical faults can be achieved and damage to downstream connected electronic devices can be mitigated.

The resulting thermally indicative electrical insulators can also reduce downtime at the system by enabling determining if the temperature at the electrical protection device is exceeding a threshold without having to power down the electrical equipment at the system to perform the measurements. The resulting thermally indicative electrical insulators enable providing constant remote diagnostics capabilities with no mandated downtime. The resulting thermally indicative electrical insulators can alert users of potential problems in the system without necessitating powering down the electrical power distribution system, or the respective portion thereof, to inspect the components. In addition, the resulting thermally indicative electrical insulators can be monitored using recording devices such as, for example, cameras viewing a scene including the electrical devices and the thermally indicative electrical insulators.

It is to be appreciated that the temperature threshold of the thermally indicative electrical insulator at which the indication occurs can be alterable based on the type of electrical device into which the thermally indicative electrical insulator is installed. It is also to be appreciated that the temperature threshold at which the thermally indicative electrical insulator is configured to provide the indication can be based on one or more factors including, but not limited to, size rating, voltage rating, current rating, ambient temperature threshold, other like factors, or any combinations thereof, associated with the electrical device into which the thermally indicative electrical insulator is being installed. It is also to be appreciated that the temperature threshold at which the thermally indicative electrical insulator is configured to provide the indication can be configured during the manufacturing stage of the insulator based on the materials, amounts, concentrations, doping, additives, treatments, or any combinations thereof, that can be utilized to manufacture the particular thermally indicative electrical insulator.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that can be embodied in various forms. In addition, each of the examples given regarding the various embodiments of the disclosure which are intended to be illustrative, and not restrictive.

Figure 2:
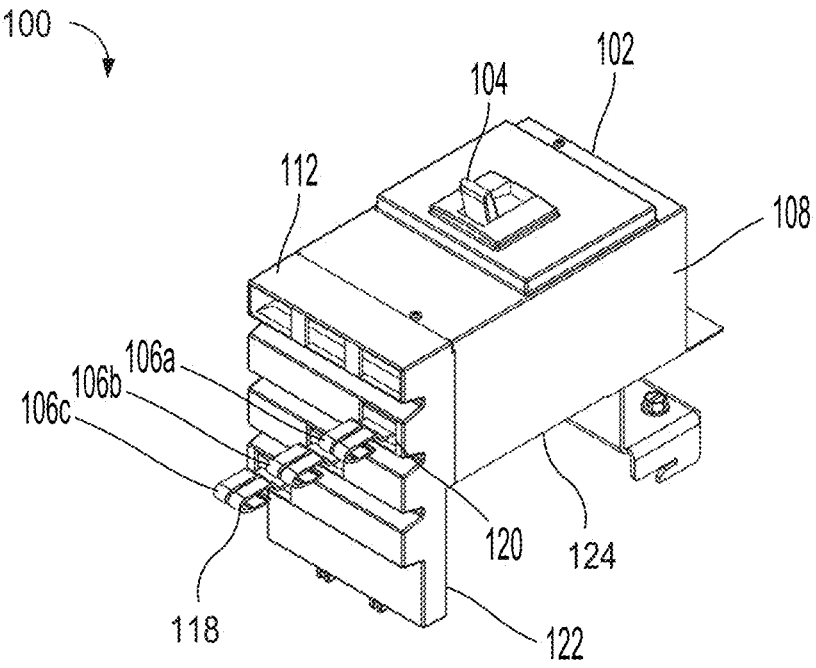
FIG. 2 is a perspective view of a non-limiting example of the electrical device in FIG. 1, according to some embodiments.
Figure 3:
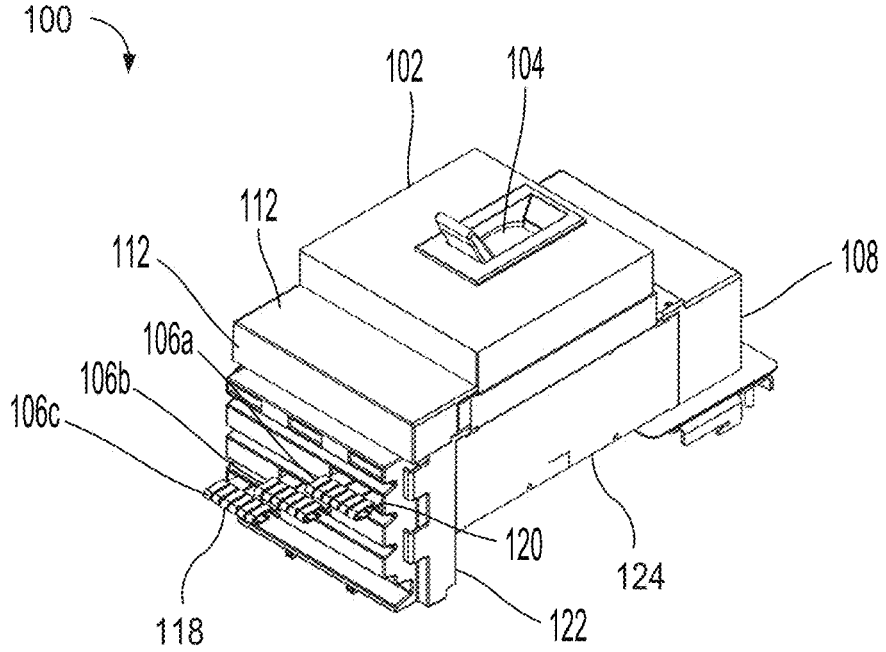
FIG. 3 is a perspective view of a second non-limiting example of the electrical device in FIG. 1, according to some embodiments.
Figure 4:
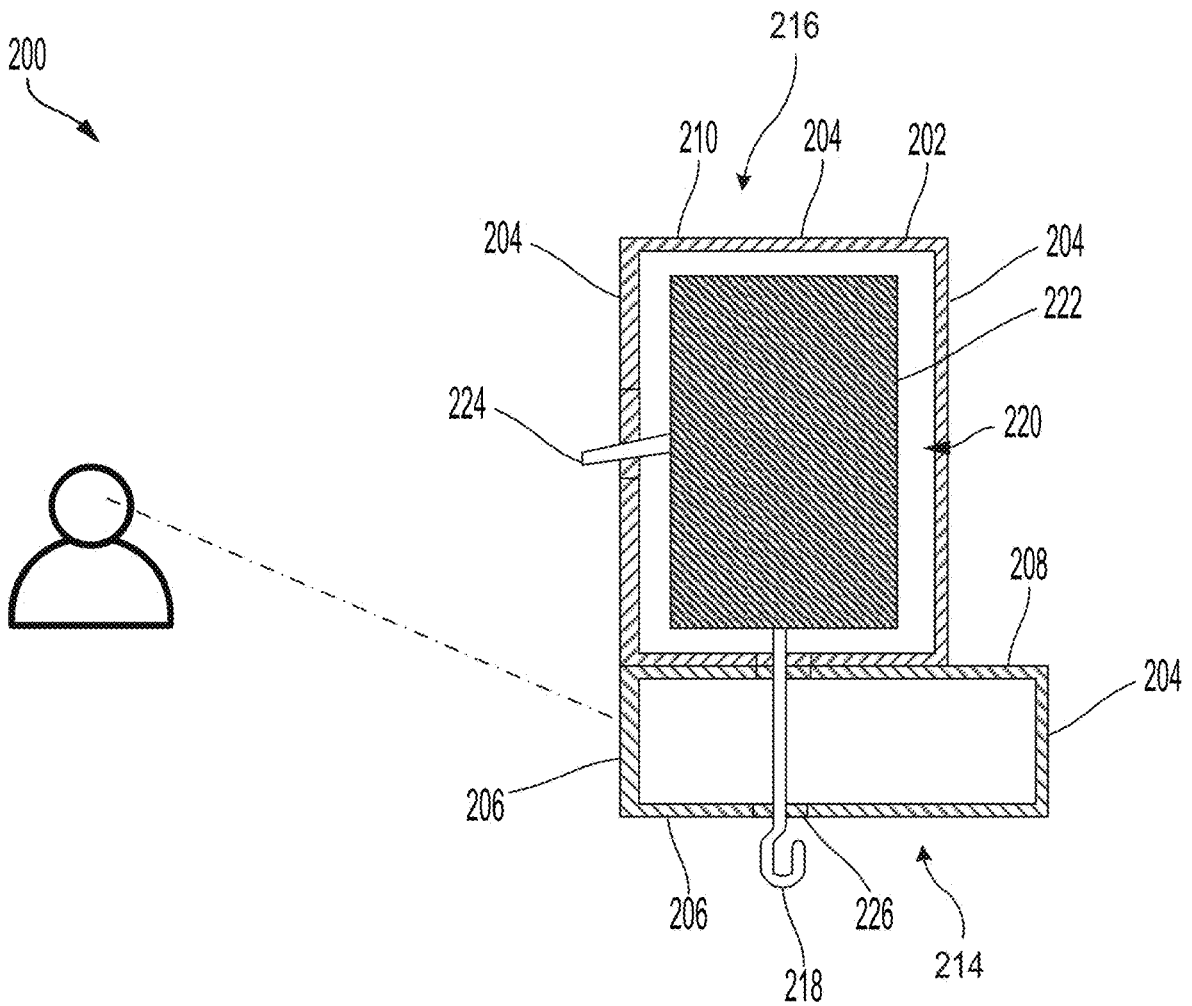
FIG. 4 is a partially exposed side view of an electrical device, according to some embodiments.

FIG. 1 is a partially exposed perspective view of an electrical device 100, according to some embodiments. The electrical device 100 can be utilized to in an electrical power distribution system, according to some embodiments. The electrical device 100 can be electrical device 200, 300, 400, as shown in FIGS. 2-4, according to various embodiments. In some embodiments, the electrical device 100 can be utilized to supply electrical power from a source to one or more connected electrical load devices such as, for example, at a respective feeder line. In some embodiments, the electrical device 100 can be an electrical protection device. The electrical protection device can include, but is not limited to, a circuit breaker, switching assembly, circuit interrupter, trip switch, fuse, protection device, over current protection device, disconnect, safety switch, cut-out switch, or other like electrical protection devices. For example, the electrical device 100 can be a circuit breaker assembly installed at an electrical distribution panel such as, for example, electrical distribution panel 602, as shown in FIG. 4.

In some embodiments, the electrical device 100 can be a circuit breaker such as, for example, electrical device 200 as shown in FIG. 2. In some embodiments, the circuit breaker can vary in size. In some embodiments, the electrical device 100 can be a circuit breaker having a range of 10 A to 1200 A, including any range or subrange therebetween. For example, the electrical device 100 can be a 10 A circuit breaker. In another example, the electrical device 100 can be a 50 A circuit breaker. In yet another example, the electrical device 100 can be a 1200 A circuit breaker.

The electrical device 100 can vary in weight. In some embodiments, the weight of the circuit breaker can be based on the size rating. In some embodiments, the electrical device 100 can include a weight of up to approximately 50 lbs. In some embodiments, the weight of the electrical device 100 can be greater than 50 lbs. In some embodiments, the weight of the electrical device can be up to 1 lb., 5 lbs., 10 lbs., 15 lbs., 20 lbs., 25 lbs., 30 lbs., 40 lbs., 50 lbs., or any weight therebetween.

The temperature threshold at which the thermally indicative electrical insulator 112 can be based on characteristics of the electrical device 100. In some embodiments, the temperature threshold of an electrical protection device having a certain size rating can be determined by a third-party entity.

In some embodiments, the circuit breakers can be molded case circuit breakers, the thermally indicative electrical insulators forming the housing, or a portion thereof, of the molded case circuit breaker. It is to be appreciated by those having ordinary skill in the art that the electrical devices shown in the figures are exemplary and not intended to be limiting. In this regard, the thermally indicative electrical insulators can be utilized on electrical devices that fall within or outside the ranges in the present disclosure.

The electrical device 100 includes a housing 102, a switch assembly 104, and an electrical connector 106. The housing 102 includes a plurality of sidewalls 108 defining an interior region 110 of the electrical device 100. The housing 102 serves as an electrical insulator that protects the internal electrical components from physical interference and serves as a barrier restricting users from coming into contact with the internal electrical components inside the housing 102 such as when the device is powered on. The housing 102 can be made of one or more plastic materials. In some embodiments, the housing 102 can be composed of one or more materials including, but not limited to, polystyrene, polypropylene, polyethylene terephthalate, polyethylene, polyvinyl chloride, polycarbonate, acrylonitrile butadiene styrene, nylon, acrylic, polylactic acid, polymethyl methacrylate, thermoplastics, other like materials, or any combinations thereof.

The electrical device 100 can include at least one thermally indicative electrical insulator 112. In some embodiments, the housing 102 can include the at least one thermally indicative electrical insulator 112. In some embodiments, the plurality of sidewalls 108 of housing 102, or one or more portions thereof, can be the thermally indicative electrical insulator 112. The thermally indicative electrical insulator 112 can also be made of one or more plastic materials including, but not limited to, polystyrene, polypropylene, polyethylene terephthalate, polyethylene, polyvinyl chloride, polycarbonate, acrylonitrile butadiene styrene, nylon, acrylic, polylactic acid, polymethyl methacrylate, thermoplastics, other like materials, or any combinations thereof. The thermally indicative electrical insulator 112 can additionally include one or more other materials that enables the thermally indicative electrical insulator 112 to provide the indication, as will be further described herein.

The housing 102, thermally indicative electrical insulators 112, or both can be arranged in the electrical device 100 so as to surround the one or more internal electrical components therein including, but not limited to, electrical conductors, electrical connectors, terminals, resistors, capacitors, inductors, switches, semiconductor devices, controllers, other like components, one or more portions thereof, or any combinations thereof. In some embodiments, the thermally indicative electrical insulators 112 can form a physical barrier so as to prevent or restrict a user from coming into contact with the components in the electrical device 100 and located within the housing 102 such as, for example, when the electrical device 100 is powered on. For example, the housing 102 can prevent users from coming into contact with the electrical components in the housing 102 using a measurement probe or some other tool. Accordingly, the housing 102 may need to be removed to enable the user to gain access to the internal components in the electrical device 100.

The thermally indicative electrical insulator 112 provides an indication to users when a temperature of the thermally indicative electrical insulator 112 exceeds a certain temperature threshold (e.g., thermal limit), as will be further described herein. The thermally indicative electrical insulator 112 is thereby located at the housing 102 and the electrical device 100 so as to be observable by users when the electrical device 100 is installed into the system such as, for example, a power distribution system.

In some embodiments, the thermally indicative electrical insulator 112, or a portion thereof, can provide a visual indication when a temperature of the thermally indicative electrical insulator 112 exceeds a certain temperature threshold. In other embodiments, the thermally indicative electrical insulator 112, or a portion thereof, can provide an audible indication when a temperature of the thermally indicative electrical insulator 112 exceeds a certain temperature threshold.

In some embodiments, the temperature threshold of the thermally indicative electrical insulator 112 can be higher for electrical protection devices having a high current rating. Correspondingly, in some embodiments, the temperature threshold of the thermally indicative electrical insulator 112 can be relatively lower for electrical protection devices having a lower current rating. For example, a temperature threshold can be higher for a thermally indicative electrical insulator in a circuit breaker assembly having a current rating of 1000 A as compared with a respective temperature threshold for a thermally indicative electrical insulator in a circuit breaker assembly having a current rating of 400 A. As such, the temperature threshold of the thermally indicative electrical insulator 112 can depend on the rating of the electrical protection device.

The thermally indicative electrical insulator 112 can provide an indication of increasing temperatures in the electrical device 100, which can be indicative of one or more fault events including, but not limited to, electrical faults, component failure, component degradation, excessive wear, overcurrent, ground arc faults, need for maintenance, other like events, or any combinations thereof. The electrical fault can cause a temperature of an electrical component in the electrical device 100 to increase, and thereby causing an ambient temperature in the electrical device 100 to increase from thermal convection, thermal conduction, or both, of the heat produced at the electrical component. As a result of the heat generated by the electrical component causing a temperature in the electrical device 100 to exceed a thermal limit, the temperature of the thermally indicative electrical insulator 112, or a portion thereof, can increase due to thermal convection, thermal conduction, or both, from heat generated in the electrical device 100 such as, for example, from one or more electrical components in the electrical device 100. For example, an electrical fault in an electrical power distribution system may in electrical connection with an electrical device 100 can cause an electrical connector 106 in the electrical device 100 to generate heat and cause an interior region or regions of the electrical device 100 to increase in temperature until the thermally indicative electrical insulator 112 exceeds the temperature threshold of the material.

It is to be appreciated by those having ordinary skill in the art that the thermally indicative electrical insulators 112 are not intended to be limited to being utilized in electrical protection devices such as electrical device 100 and can be utilized in any of a plurality of components in electrical connection with the electrical power distribution system to provide an indication that the temperature at the respective component is exceeding the temperature threshold.

When the thermally indicative electrical insulator 112 is installed in the electrical device 100, a temperature of the thermally indicative electrical insulator 112 can increase in response to increasing temperatures in the electrical device 100. When the temperature of the thermally indicative electrical insulator 112, or a portion thereof, exceeds the temperature threshold, the thermally indicative electrical insulator 112 can provide the indication. For example, the temperature of the thermally indicative electrical insulator 112 can exceed the temperature threshold in response to increasing ambient temperatures in the electrical device 100 due to an electrical fault in the electrical power distribution system.

The electrical device 100 includes the switch assembly 104. The switch assembly 104 can be located in the interior region 110 defined by the housing 102. In some embodiments, the switch assembly 104 can substantially be located in the interior region 110 defined by the housing 102. In some embodiments, the temperature of the thermally indicative electrical insulator 112 can exceed the temperature threshold in response to a failure of the switch assembly 104 in the electrical protection device causing an increase in the ambient temperature in the housing.

The electrical device 100 includes switch assembly 104. The switch assembly 104 can be configured to switch between open and closed states in response to a state of an electric current measured by the electrical device 100. The switch assembly 104 can be located in the interior region 110. In some embodiments, the switch assembly 104 can include therein one or more switching devices. In some embodiments, the switching devices can be semiconductor devices. When installed into an electrical power distribution system and in the closed state, the switch assembly 104 may be configured to automatically trip open as a result of detecting an electric fault in the electrical power distribution system to provide the electrical fault protection.

The electrical device 100 can include other electrical components therein including, but not limited to, electrical connectors, electrical conductors, switches, semiconductor switches, resistors, capacitors, other like electrical components, or any combinations thereof. In some embodiments, the switch assembly 104 can include one or more semiconductor devices including, but not limited to, diodes, transistors, thyristors, metal-oxide-semiconductor field-effect transistors (MOSFETs), rectifiers, silicon-controlled rectifiers (SCRs), insulated-gate bipolar transistors (IGBTs), unijunction transistors, TRIACs, bipolar junction transistors (BJTs), other semiconductor devices, or any combinations thereof. In some embodiments, the switch assembly 104 can be a switching device including, but not limited to, circuit breakers, single pole switches, single pole double throw switches, double pole switches, double pole double throw switches, two pole six throw switches, fuses, relays, toggle switches, rocker switches, limit switches, pushbutton switches, biased switches, magnetic switches, smart switches, temperature switches, other types of switches, or any combinations thereof. The electrical components in the electrical device 100 and the switch assembly 104 are not intended to be limiting, and the electrical device 100 and the switch assembly 104 can include therein one or more electrical components in accordance with the present disclosure and as can be appreciated by those having ordinary skill in the art.

The electrical device 100 includes the electrical connector 106. The electrical connector 106 includes a first end 114 and a second end 116. The electrical connector 106 can include a terminal 118 at its first end 114, second end 116, or both. The first end 114 of the electrical connector 106 can be connectable to another electrical component in the electrical power distribution system such as, for example, a corresponding receptacle at an electrical distribution panel to thereby place electrical device 100 in electrical connection with a main supply bus and to enable supplying electrical power to one or more connected electrical load devices. In some embodiments, the first end 114 can be connectable to the main supply bus in the electrical distribution panel.

The second end 116 can be in electrical connection with the switch assembly 104 in the housing 102. The electrical connector 106 can extend from the electrical device 100 through the housing 102. That is, in some embodiments, the housing 102 can include an aperture 120 located in a sidewall of the plurality of sidewalls 108, and the electrical connector 106 can extend from the housing 102 through the aperture 120 and towards the distal first end 114.

In some embodiments, the electrical connector 106 can include a terminal 118 at the first end 114, the second end 116, or both. At the first end 114, the terminal 118 enables electrically connecting the electrical connector 106 with another electrical component, and thereby electrically connecting the switch assembly 104 to the electrical component. The second end 116 of the electrical connector 106 can also include a terminal 118 to enable connecting the electrical connector 106 to the switch assembly 104. In some embodiments, the terminal 118 can include, but is not limited to, a plug-in terminal, square D terminal, a terminal block, lug terminal, quick connect tab terminal, screw terminal, threaded stud terminal, box wire connector terminal, push-in stud terminal, multi-cable terminal, C-clip terminal, other like terminals, or any combinations thereof.

It is to be appreciated by those having ordinary skill in the art that the type of terminal of the electrical connector 106 is not intended to be limiting and can include these and other types of terminal connectors to enable connecting the electrical device 100 to another electrical component, in accordance with the present disclosure.

FIG. 2 is a perspective view of a non-limiting example of the electrical device 100 in FIG. 1, according to some embodiments. FIG. 3 is a perspective view of a second non-limiting example of the electrical device 100 in FIG. 1, according to some embodiments. Unless specifically referenced, FIGS. 2 and 3 will be described collectively.

The electrical device 100 includes housing 102, switch assembly 104, and a plurality of electrical connectors 106. The housing 102 includes housing member 122 and housing member 124.

In some embodiments, the housing 102 can be a single housing. In other embodiments, the housing 102 can include a plurality of members. In other embodiments, the housing 102 can include housing member 122, housing member 124, and one or more other members.

The electrical device 100 includes switch assembly 104. The switch assembly 104 is located within the housing 102. The switch assembly 104 includes a toggle switch 126 extending through a sidewall of the housing member 124 for manually switching the switch assembly 104 between the open and closed states.

The electrical device 100 includes the plurality of electrical connectors 106. The electrical connectors 106 include electrical connector 106a, electrical connector 106b, and electrical connector 106c. In some embodiments, the electrical device 100 includes an electrical connector 106 for each respective phase of the system to which the electrical device 100 is connectable. For example, the electrical system may provide three-phase power to the connected electronic devices and the electrical device 100 including three electrical connectors 106 for each respective phase. In some embodiments, the electrical device 100 may include a single electrical connector 106. In other embodiments, the electrical device 100 may include two electrical connectors 106. In other embodiments, the electrical device 100 may include three electrical connectors 106. In yet other embodiments, the electrical device 100 may include three or more of the electrical connectors 106.

The housing 102 includes an aperture 120 through which the electrical connector 106 extends from the electrical device 100 to a distal end. In some embodiments, the housing 102 can include an aperture 120 for each respective electrical connector 106 extending through the housing 102. The housing 102 can include other apertures such as, for example, for the toggle switch to extend through the housing 102 of electrical device 100.

It is to be appreciated that the electrical device 100 can include one or more other components not referenced herein for enabling the electrical device 100 to be placed in electrical connection with the main supply bus and to enable the electrical device 100 to provide the fault current protection such as, for example, screws, clips, fasteners, brackets, other components including electrical components known to those having ordinary skill in the art, or any combinations thereof.

FIG. 4 is an exposed side view of the electrical device 200, according to some embodiments.

The electrical device 200 includes a housing 202. The housing 202 serves as an electrical insulator surrounding the one or more electrical components therein. The housing 202 includes sidewalls 204. In some embodiments, the housing 202 includes one or more of the sidewalls 204. In some embodiments, the housing 202 include a plurality of the sidewalls 204.

The housing 202 can be made of plastic. In some embodiments, the housing 202 can be made of one or more polymeric materials including, but not limited to, polystyrene, polypropylene, polyethylene terephthalate, polyethylene, polyvinyl chloride, polycarbonate, polyurethane, polytetrafluoroethylene (PTFE), polyether ether ketone (PEEK), acrylonitrile butadiene styrene, nylon, acrylic, polylactic acid, polymethyl methacrylate, thermoplastics, other like materials, or any combinations thereof.

In addition, the electrical device 200 includes a thermochromic sidewall 206. In some embodiments, the housing 202 includes a thermochromic sidewall 206. In some embodiments, the housing 202 can include at least one thermochromic sidewall 206. In some embodiments, the housing 202 can include one or more thermochromic sidewalls 206. In other embodiments, the housing 202 can include a plurality of thermochromic sidewalls 206. That is, in some embodiments, one or more of the sidewalls 204 can be the thermochromic sidewall 206. In other embodiments, each of the sidewalls 204 can be a thermochromic sidewall 206.

The thermochromic sidewall 206 can be formed including a base material similar to sidewall 204 and can also include one or more thermochromic additive materials. The base materials can be mixed with the thermochromic additive materials to forming the thermochromic sidewalls 206 that can provide the thermochromic indication. In some embodiments, the thermochromic additive materials can be, but is not limited to, thermochromic liquid crystals, thermochromic pigments, microencapsulated thermochromic pigments, hybrid thermochromic materials, inorganic thermochromic materials, or any combinations thereof. In some embodiments, the thermochromic additive materials can be dyes. In other embodiments, the thermochromic additive materials can be pigments. In some embodiments, the thermochromic sidewall 206 can include the same materials as the sidewalls 204, and the thermochromic sidewall 206 further including the one or more thermochromic additive materials.

In some embodiments, the thermochromic sidewall 206 may be a thermochromic pigment including a dye, acid, and solvent. The dye may be configured to enable the thermochromic sidewall 206 to change states based on a chemical environment of the medium (e.g., based on pH) of the thermochromic sidewall 206. In some embodiments, the dyes may include spirolactones, flourans, spiropyrans, fulgides, other like dyes, or any combinations thereof. The acid balances the chemical environment of the dye and enables the reversible response of the thermochromic sidewall 206. In some embodiments, the acid can also affect the intensity of the color of the thermochromic sidewall 206. In some embodiments, the acid may be bispenol A. In some embodiments, the solvent can include alcohol, ester, or both.

The thermochromic sidewall 206 serves as a thermally indicative electrical insulator for the electrical device 200. The thermochromic sidewall 206 also includes the thermochromic material so as to enable the thermochromic sidewall 206 to provide a visual indication to users when a temperature at the electrical device 200 exceeds a certain temperature threshold. The thermochromic sidewall 206 is thereby arranged at the housing 202 and the electrical device 200 so as to be observable by users observing the electrical device 200 such as, for example, when the electrical device 200 is installed into an electrical distribution panel.

In some embodiments, the at least one thermochromic sidewall 206 can be configured to transition from a first color to a second color when the temperature of the thermochromic sidewall 206 exceeds a temperature threshold. In some embodiments, the thermochromic sidewall 206 can be configured to transition between a respective first color and second color depending on if the temperature of the thermochromic sidewall 206 is below the temperature threshold or above the temperature threshold, respectively. In some embodiments, the thermochromic sidewall 206 can be a first color when the temperature of the thermochromic sidewall 206 is below a temperature threshold. In some embodiments, the thermochromic sidewall 206 transitions from the first color to a second color in response to the thermochromic sidewall 206 exceeding the temperature threshold. In some embodiments, a portion of the thermochromic sidewall 206 can transition from the first color to the second color in response to the portion of the thermochromic sidewall 206 exceeding the temperature threshold.

The housing 202 can include one or more members, according to some embodiments. The sidewalls 204 of the housing 202 can form the one or more members of the housing 202. In some embodiments, the thermochromic sidewall 206 can form the one or more members of the housing 202, or portions thereof. In some embodiments, the housing 202 can include housing member 208 and housing member 210. In some embodiments, the housing 202 can include housing member 208, housing member 210, and through housing member 212$n$.

Electrical device 200 includes housing member 208 and housing member 210. The housing member 208 and housing member 210 each act as electrical insulators surrounding the electrical components in electrical device 200 and preventing a user or object from coming into contact with the internal electrical components in the electrical device 200. In some embodiments, the housing member 208, housing member 210, or both, can include the sidewalls 204.

Additionally, in some embodiments, the housing member 208, housing member 210, or both, can include the thermochromic sidewall 206. The thermochromic sidewall 206 acts as a thermally indicative electrical insulator. Similar to the sidewalls 204, the thermochromic sidewall 206 act as electrical insulators surrounding the electrical components in electrical device 200 and preventing a user or object from coming into contact with the internal electrical components in the electrical device 200. The thermochromic sidewall 206 also provide the visual indication when the temperature of the thermochromic sidewall 206 exceeds the temperature threshold.

The electrical device 200 can include a first end 214 and a second end 216. In addition, the electrical device 200 includes an electrical connector 218. In some embodiments, the electrical connector 218 can be located at the first end 214. The electrical connector 106 can extend through an aperture 226 formed in the housing member 208, housing member 210, or both.

In some embodiments, the electrical device 200 can be installable into a corresponding receptable at an electrical power distribution panel of an electrical system. When inserted into the receptable, the electrical connector 218 can be placed in electrically communicable connection with a main bus of the panel, and the electrical connector 218 can supply the power to the switch assembly 222 in the electrical device 200. In some embodiments, the electrical device 200 can include a plurality of electrical connectors 218 extending from the switch assembly 222 in the housing 202 of electrical device 200 and distally extending outwards from the housing 202 at the first end 214.

In some embodiments, the housing member 208 can be located at the first end 214 of electrical device 200. In some embodiments, the housing member 210 can be located at the second end 216 of electrical device 200. In some embodiments, the one or more electrical connectors 218 can extend through the housing member 208 at the first end 214 and away from the housing 202 so as to enable the electrical connector 218 to be installed in the electrical power distribution system and to place the electrical device 200 in electrical connection with the system using the electrical connector 218.

The electrical device 200 includes interior region 220. The interior region 220 can be defined by housing member 208, housing member 210, or combinations thereof, according to some embodiments. In some embodiments, the interior region 220 can be defined by the sidewalls 204, the thermochromic sidewall 206, or both.

The electrical device 200 includes switch assembly 222. The switch assembly 222 can be configured to switch between open and closed states in response to a state of an electric current measured by the electrical device 200. The switch assembly 222 can be located in the interior region 220. In some embodiments, the switch assembly 222 can include therein one or more switching devices. In some embodiments, the switching devices can be semiconductor devices. When installed into an electrical power distribution system and in the closed state, the switch assembly 222 may be configured to automatically trip open as a result of detecting an electric fault in the electrical power distribution system to provide the electrical fault protection.

The switch assembly 222 can also include one or more components for manually switching between the open and closed states. In some embodiments, for example, the switch assembly 222 can include toggle switch 224 to enable a user to manually trip open the electrical device 200 and to manually switch closed the switch assembly 222 in the electrical device 200.

Figure 5:
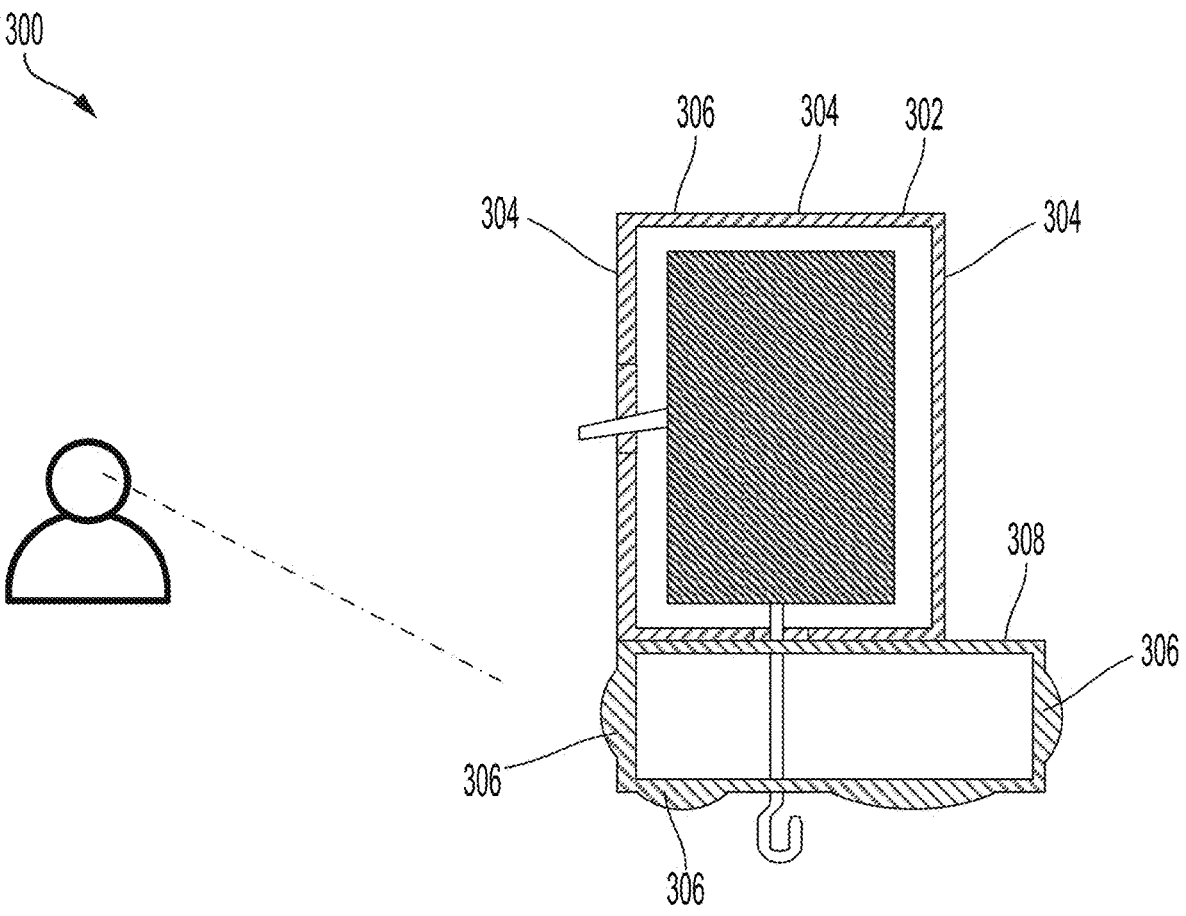
FIG. 5 is a partially exposed side view of an electrical device, according to some embodiments.

FIG. 5 is a partially exposed side view of an electrical device 300, according to some embodiments.

The electrical device 300 includes a housing 302. The housing 302 serves as an electrical insulator surrounding the one or more electrical components therein. The housing 302 includes sidewalls 304. In some embodiments, the housing 302 includes one or more of the sidewalls 304. In some embodiments, the housing 302 include a plurality of the sidewalls 304. The housing 302 can be made of one or more plastic materials including, but not limited to, polystyrene, polypropylene, polyethylene terephthalate, polyethylene, polyvinyl chloride, polycarbonate, polyurethane, polytetrafluoroethylene (PTFE), polyether ether ketone (PEEK), acrylonitrile butadiene styrene, nylon, acrylic, polylactic acid, polymethyl methacrylate, thermoplastics, other like materials, or any combinations thereof.

In addition, the electrical device 300 includes a thermally indicative sidewall 306 configured to provide the visual indication of the temperature of the thermally indicative sidewalls 606 exceeding the temperature threshold. In some embodiments, the housing 302 includes the thermally indicative sidewall 306. In some embodiments, the housing 302 can include at least one thermally indicative sidewall 306. In some embodiments, the housing 302 can include one or more thermally indicative sidewalls 306. In other embodiments, the housing 302 can include a plurality of thermally indicative sidewall 306. That is, in some embodiments, one or more of the sidewalls 304 can be the thermally indicative sidewalls 306. In other embodiments, each of the sidewalls 304 can be a thermally indicative sidewalls 306.

The housing 302 can include one or more members, according to some embodiments. The sidewalls 304 of the housing 302 can form the one or more members of the housing 302. In some embodiments, the thermally indicative sidewalls 306 can form the one or more members of the housing 302, or portions thereof. In some embodiments, the housing 302 can include housing member 308 and housing member 310. In some embodiments, the housing 302 can include housing member 308, housing member 310, and through housing member 312n.

Electrical device 200 includes housing member 308 and housing member 310. The housing member 308 and housing member 310 each act as electrical insulators surrounding the electrical components in electrical device 300 and preventing a user or object from coming into contact with the internal electrical components in the electrical device 300. In some embodiments, the housing member 308, housing member 310, or both, can include the sidewalls 304.

Additionally, in some embodiments, the housing member 308, housing member 310, or both, can include the thermally indicative sidewalls 306. The thermally indicative sidewalls 306 acts as a thermally indicative electrical insulator. Similar to the sidewalls 304, the thermally indicative sidewalls 306 act as electrical insulators surrounding the electrical components in electrical device 300 and preventing a user or object from coming into contact with the internal electrical components in the electrical device 300. The thermally indicative sidewalls 306 also provide the visual indication when the temperature of the thermally indicative sidewalls 306 exceeds the temperature threshold.

The thermally indicative sidewalls 306 may be made of one or more materials similar to the sidewalls 304. In some embodiments, the thermally indicative sidewalls 306 may also include one or more materials other materials that causes the thermally indicative sidewalls 306 to expand as a result of the temperature reaching or exceeding the temperature threshold. When the thermally indicative sidewalls 306 exceeds the temperature threshold, the thermally indicative sidewalls 306 may expand, swell, bulge, or any combinations thereof to provide the visual indication to the observer of the temperature of the housing 102 and at the electrical device 300 exceeding the temperature threshold. In some embodiments, the thermally indicative sidewalls 306 can be made of the same materials as the sidewalls 304, and the thermally indicative sidewalls 306 can further include one or more materials determined based on a desired amount of expansion.

It is to be appreciated by those having ordinary skill in the art that many insulating materials can expand under heating. In this regard, the materials selected for the thermally indicative sidewalls 306 can be determined based on the amount of expansion deemed necessary relative the other sidewalls 304 to provide the visual indication that the temperature of the thermally indicative sidewalls 306 has exceeded a temperature threshold.

The thermally indicative sidewalls 306 may include one or more materials to enable the thermal expansion in response to heating including, but not limited to, acetal, Delrin, nylon 6, nylon 6.6, polypropylene, poly vinyl chloride, high-density polypropylene, ultra-high molecular weight polyethylene (UHMWPE), polyurethane, polytetrafluoroethylene (PTFE), polyether ether ketone (PEEK), acrylonitrile butadiene styrene (ABS), polyvinylidene fluoride (PVDF), acrylic, polycarbonate, polyethylene terephthalate (PET), other like materials, or any combinations thereof. In some embodiments, the materials of the thermally indicative sidewalls 306 may provide the visual indication by having a different thermal coefficient of expansion from the materials used to form the sidewalls 304.

Accordingly, when the temperature in the electrical device 300 increases and reaches the temperature threshold, the thermally indicative sidewalls 306 may expand to provide the visual indication, whereas the sidewalls 304 can resist such expansion at the temperature threshold as a result of having a higher temperature threshold than the thermally indicative sidewalls 306. In some embodiments, the thermally indicative sidewalls 306 may have a first temperature threshold, and the housing member 308 may have a second temperature threshold, the first temperature threshold being lower than the second temperature threshold. In addition, the first temperature threshold may be based on the rating of the electrical device 300, and the second temperature threshold may be based on the rating of the electrical device 300 and the first temperature threshold so that the sidewalls 304 does not expand until the temperature in the electrical device 300 is much greater than when the thermally indicative sidewalls 306 expands.

In some embodiments, the thermally indicative sidewalls 306 may include one or more additives therein that are configured to release gases when the temperature of the thermally indicative sidewalls 306 reaches the temperature threshold. When the temperature reaches the temperature threshold, the additives may be configured to release gas, thereby causing the thermally indicative sidewalls 306 to provide the visual indication.

Figure 6:
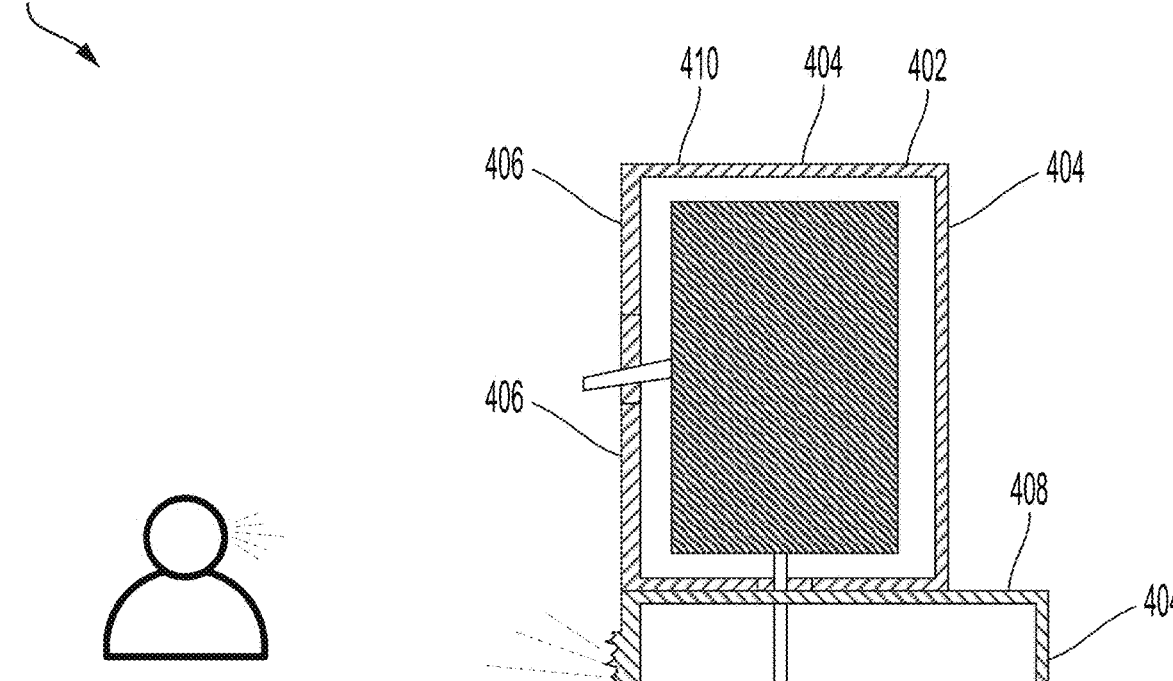
FIG. 6 is a partially exposed side view of an electrical device, according to some embodiments.

FIG. 6 is a partially exposed side view of an electrical device 400, according to some embodiments.

The electrical device 400 includes a housing 402. The housing 402 serves as an electrical insulator surrounding the one or more electrical components therein. The housing 402 includes sidewalls 404. In some embodiments, the housing 402 includes one or more of the sidewalls 404. In some embodiments, the housing 402 include a plurality of the sidewalls 404. The housing 402 can be made of one or more plastic materials including, but not limited to, polystyrene, polypropylene, polyethylene terephthalate, polyethylene, polyvinyl chloride, polycarbonate, polyurethane, polytetrafluoroethylene (PTFE), polyether ether ketone (PEEK), acrylonitrile butadiene styrene, nylon, acrylic, polylactic acid, polymethyl methacrylate, thermoplastics, other like materials, or any combinations thereof.

In addition, the electrical device 400 includes a thermally indicative sidewall 406 configured to provide the audible indication of the temperature of the thermally indicative sidewalls 406 exceeding the temperature threshold. In some embodiments, the housing 402 includes the thermally indicative sidewall 406. In some embodiments, the housing 402 can include at least one thermally indicative sidewall 406. In some embodiments, the housing 402 can include one or more thermally indicative sidewalls 406. In other embodiments, the housing 402 can include a plurality of thermally indicative sidewall 406. That is, in some embodiments, one or more of the sidewalls 404 can be the thermally indicative sidewalls 406. In other embodiments, each of the sidewalls 404 can be a thermally indicative sidewalls 406.

The housing 402 can include one or more members, according to some embodiments. The sidewalls 404 of the housing 402 can form the one or more members of the housing 402. In some embodiments, the thermally indicative sidewalls 406 can form the one or more members of the housing 402, or portions thereof. In some embodiments, the housing 402 can include housing member 408 and housing member 410. In some embodiments, the housing 402 can include housing member 408, housing member 410, and through housing member 412$n$.

Electrical device 200 includes housing member 408 and housing member 410. The housing member 408 and housing member 410 each act as electrical insulators surrounding the electrical components in electrical device 400 and preventing a user or object from coming into contact with the internal electrical components in the electrical device 400. In some embodiments, the housing member 408, housing member 410, or both, can include the sidewalls 404.

Additionally, in some embodiments, the housing member 408, housing member 410, or both, can include the thermally indicative sidewalls 406. The thermally indicative sidewalls 406 acts as a thermally indicative electrical insulator. Similar to the sidewalls 404, the thermally indicative sidewalls 406 act as electrical insulators surrounding the electrical components in electrical device 400 and preventing a user or object from coming into contact with the internal electrical components in the electrical device 400. The thermally indicative sidewalls 406 also provide the visual indication when the temperature of the thermally indicative sidewalls 406 exceeds the temperature threshold.

The thermally indicative sidewalls 406 may be made of one or more materials similar to the sidewalls 404. In some embodiments, the thermally indicative sidewalls 406 may also include one or more other materials that causes the thermally indicative sidewalls 406 to emit an audible noise as a result of the temperature reaching or exceeding the temperature threshold. When the thermally indicative sidewalls 406 exceeds the temperature threshold, the thermally indicative sidewalls 406 may emit a desired noise to provide the audible indication to the observer of the temperature of the thermally indicative sidewalls 406 at the housing 402 and the electrical device 400 exceeding the temperature threshold.

The thermally indicative sidewalls 406 may include one or more base materials based on the insulation requirements and one or more additive materials. The one or more additive materials can be configured to cause the thermally indicative sidewalls 406, after a manufacturing stage, to produce a desired noise in response to a temperature of the thermally indicative sidewalls 406 exceeding a temperature threshold. In this regard, the one or more materials of the thermally indicative sidewalls 406 may be selected so as to produce the desired sound. In some embodiments, the thermally indicative sidewalls 406 may include the same materials used to form the sidewalls 404 based on the insulation requirements of the thermally indicative sidewalls 406, and the thermally indicative sidewalls 406 can further include one or more additive materials including, but not limited to, acetal, Delrin, nylon 6, nylon 6.6, polypropylene, poly vinyl chloride, high-density polypropylene, ultra-high molecular weight polyethylene (UHMWPE), polyurethane, polytetrafluoroethylene (PTFE), polyether ether ketone (PEEK), acrylonitrile butadiene styrene (ABS), polyvinylidene fluoride (PVDF), acrylic, polycarbonate, polyethylene terephthalate (PET), other like materials, or any combinations thereof. In some embodiments, the materials of the thermally indicative sidewalls 406 may provide the indication by having a different thermal coefficient of expansion from the materials used to form the sidewalls 404.

Accordingly, when the temperature in the electrical device 400 increases and reaches the temperature threshold, the thermally indicative sidewalls 406 may emit the desired noise to provide the indication, whereas the sidewalls 404 can resist such indication at the temperature threshold as a result of having a higher temperature threshold than the thermally indicative sidewalls 406. In some embodiments, the thermally indicative sidewalls 406 may have a first temperature threshold, and the housing member 408 may have a second temperature threshold, the first temperature threshold being lower than the second temperature threshold. In addition, the first temperature threshold may be based on the rating of the electrical device 400, and the second temperature threshold may be based on the rating of the electrical device 400 and the first temperature threshold so that the sidewalls 404 does not expand until the temperature in the electrical device 400 is much greater than when the thermally indicative sidewalls 406 expands.

In some embodiments, the thermally indicative sidewalls 406 may include one or more additives therein that are configured to release gases when the temperature of the thermally indicative sidewalls 406 reaches the temperature threshold. When the temperature reaches the temperature threshold, the additives may be configured to release the gas, thereby causing the thermally indicative sidewalls 406 to provide the indication.

Figure 7:
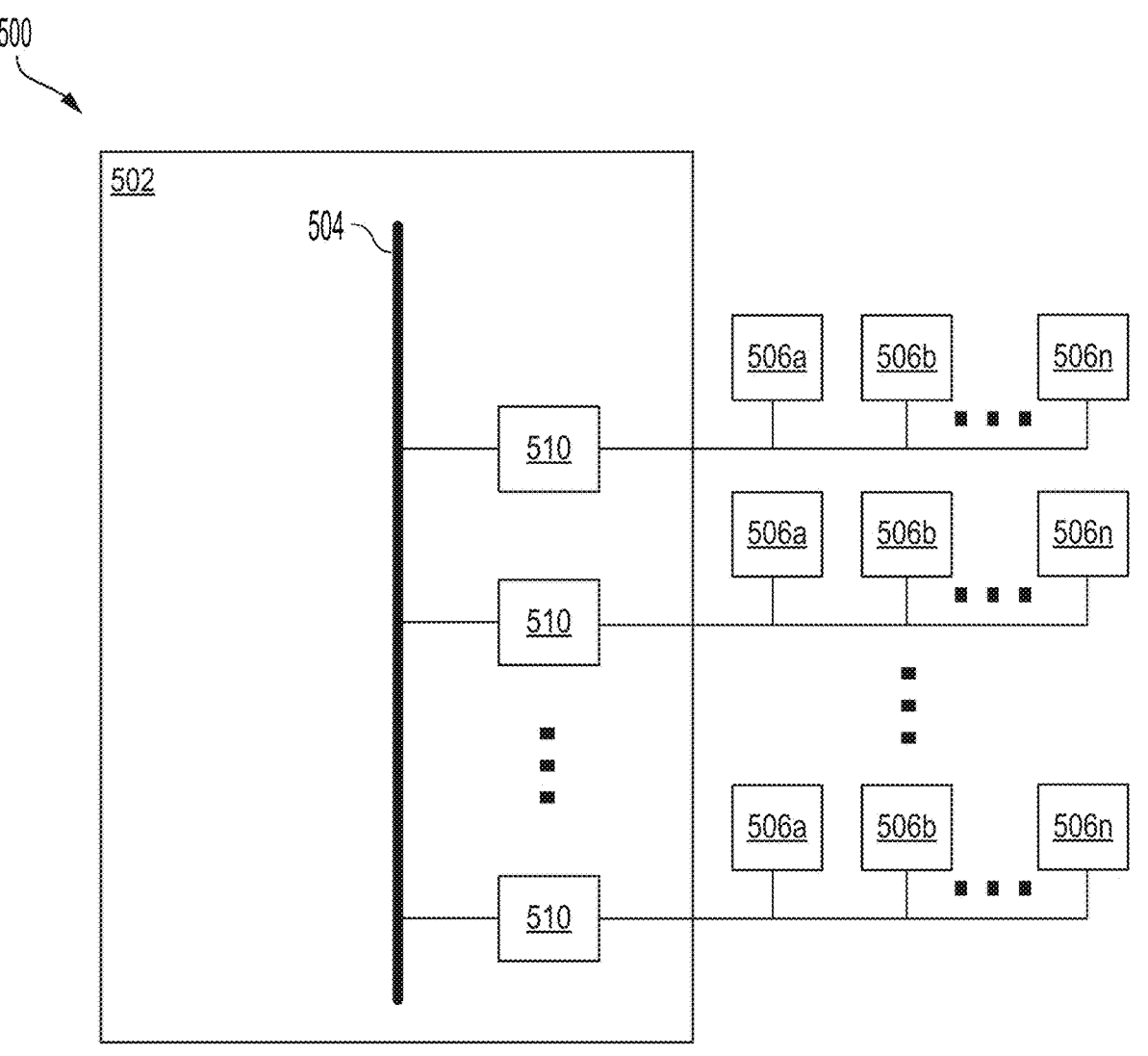
FIG. 7 is a schematic diagram illustrating a system, according to some embodiments.

FIG. 7 is a schematic diagram illustrating a system 500, according to some embodiments. The system 500 can be an electrical power distribution system for supplying electrical power in the form of electrical current to one or more electronic devices connected to the system 500.

The system 500 can include an electrical distribution panel 502. The electrical distribution panel 502 can include a main supply bus 504. The main supply bus 504 supplied power from the system 500 to one or more electrical load devices 506 connected to the main bus 504 via one or more respective feeder lines 508, according to some embodiments.

The system 500 can include one or more electrical devices 510 in electrical connection with the system 500. In some embodiments, the electrical device 510 can be similar to electrical devices 100, 200, 300, or 400, as shown in FIGS. 1-6. In some embodiments, the electrical device 510 can be electrical protection devices configured to supply the electrical load devices 506 connected to the respective feeder lines 508 with electrical power from the main bus 504 when in the close state. In some embodiments, the electrical device 510 can be electrical protection devices configured to isolate the electrical load devices 506 connected to the respective feeder lines 508 from the main bus 504 when in the open state.

Figure 8:
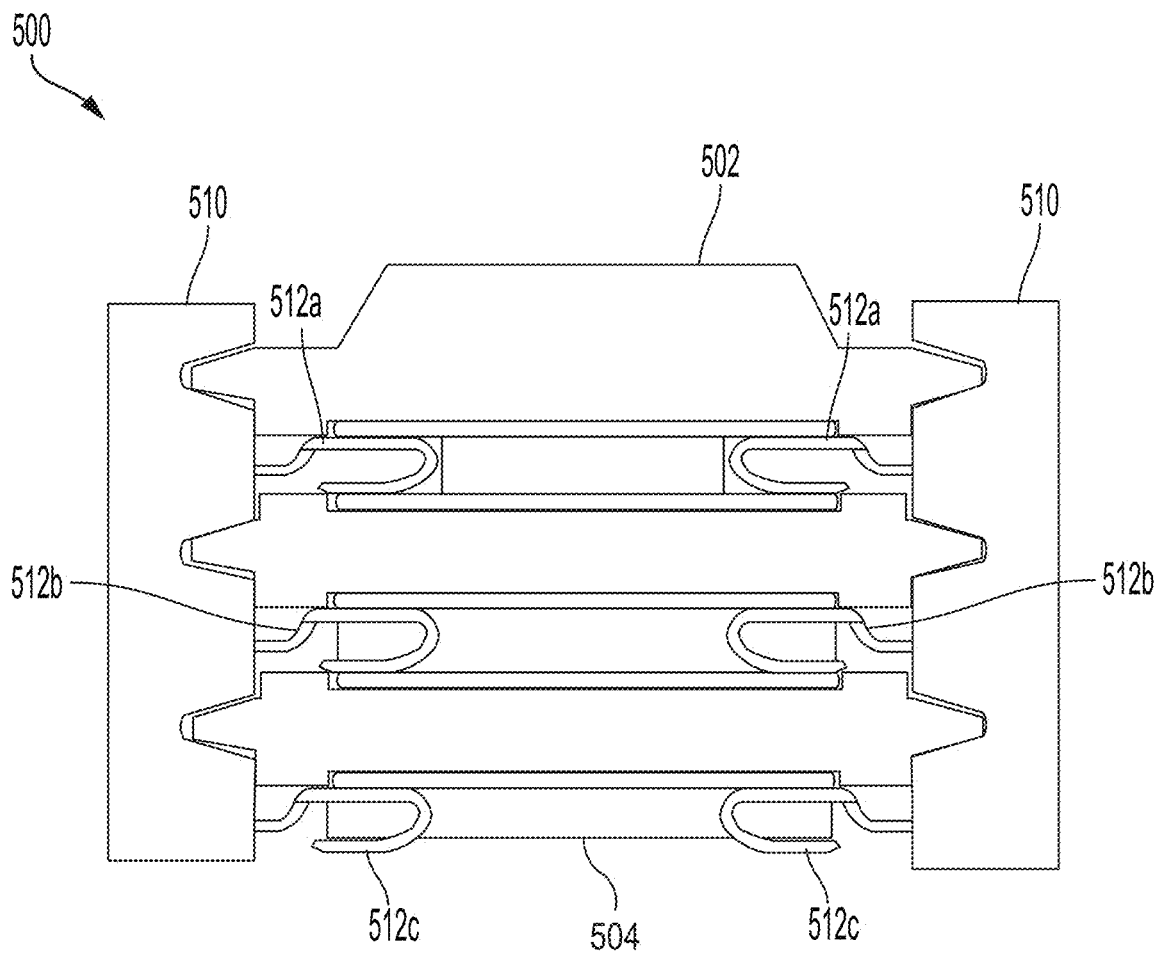
FIG. 8 is a front view of a portion of the system in FIG. 7, according to some embodiments.

FIG. 8 is a front view of a portion of the system 500 in FIG. 7, according to some embodiments.

The system 500 can include the electrical distribution panel 502. The electrical distribution panel 502 including the main bus 504 to supply power to the one or more electronic devices 506 connected to the electrical distribution panel 502 at the respective feeder lines 508. The system 500 may include an electrical device 510. In some embodiments, the system 500 can include a plurality of the electrical device 510. The electrical device 510 may be located between the main bus 504 and the respective feeder lines 508. As such, the electrical device 510 may also be located between the main bus 504 and the electrical load devices 506 connected to the respective feeder lines 508.

In some embodiments, the electrical device 510 can include one or more electrical connectors 512. The number of electrical connectors 512 that the electrical device 510 includes may depend on the number of phases of the main bus 504 at the electrical distribution panel 502. That is, if the main bus 504 is configured to supply three-phase power to the respective feeder lines 508 and to the electrical load devices 506 connected thereto, the electrical device 510 includes an electrical connector 512 for each respective phase of power from the electrical distribution panel 502. When placed in electrical connection with the system 500, each electrical connector 512 of the electrical device 510 may be placed in electrical connection with a respective phase of the system 500. In some embodiments, the electrical device 510 can include one electrical connector 512. In other embodiments, the electrical device 510 can include a plurality of the one or more electrical connectors 512.

Referring to FIG. 8, the system 500 supplies three phase power to the connected electrical load devices 506 and the electrical device 510 includes electrical connector 512*a*, electrical connector 512*b*, and electrical connector 512*c* corresponding to each phase.

In some embodiments, the electrical device 510 includes a housing 514. The side of the housing 514 may be configured so as to enable installing the electrical device 510 into the electrical distribution panel 502 so that the electrical device 510 can be placed in electrical connection with the system 500. For example, the housing 514 may include a size, shape, and dimensions that correspond to the features at the electrical distribution panel 502 at the location where the one or more electrical connectors 512 of the electrical device 510 can be installed. Referring to FIG. 8, it can be seen that the electrical distribution panel 502 includes a plurality of protrusions extending outward, and the housing 514 can include a plurality of recesses 516 that conform to these protrusions so as to enable the electrical device 510 to be installed into the electrical distribution panel 502.

It is to be appreciated that the size, shape, and dimensions of the one or more components shown in the above figures are not intended to be limiting and the one or more components can include these and other sizes, shapes, and dimensions that may not be discussed herein so as to enable the electrical devices including the thermally indicative electrical insulators can be placed in connection with the electrical system such as, for example, system 500, and the electrical devices can provide the indication of the temperature of the insulator material when exceeding the temperature threshold, in accordance with the present disclosure.

It is to be appreciated by those having ordinary skill in the art that the embodiments of the electrical device described herein can provide one or more indications in response to the temperature of the thermally indicative sidewall exceeding the temperature threshold. In some embodiments, the electrical device can provide a visual indication, audible indication, or both. In some embodiments, the indication provided by the electrical device can include a color change, expanding in size, emitting a noise, or any combinations thereof. In this regard, the thermally indicative sidewalls may be made of one or more polymeric base materials and one or more additional materials so as to enable the thermally indicative sidewalls to provide the indication in response to the temperature exceeding the temperature threshold. It is also to be appreciated that the temperature threshold of the thermally indicative sidewalls can vary based on the application such as, for example, based on the current rating of the electrical device.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it can. Furthermore, the phrases "in another embodiment" and "in some other embodiments" as used herein do not necessarily refer to a different embodiment, although it can. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

disposed directly between both of the two other structural elements such that the particular structural component is in direct contact with both of the two other structural elements;

disposed directly next to only one of the two other structural elements such that the particular structural component is in direct contact with only one of the two other structural elements;

disposed indirectly next to only one of the two other structural elements such that the particular structural component is not in direct contact with only one of the two other structural elements, and there is another element which juxtaposes the particular structural component and the one of the two other structural elements;

disposed indirectly between both of the two other structural elements such that the particular structural component is not in direct contact with both of the two other structural elements, and other features can be disposed therebetween; or any combination(s) thereof.

As used herein "embedded" means that a first material is distributed throughout a second material.

ASPECTS

Various Aspects are described below. It is to be understood that any one or more of the features recited in the following Aspect(s) can be combined with any one or more other Aspect(s).

Aspect 1. A circuit breaker assembly comprising: a housing comprising: a plurality of sidewalls, wherein the plurality of sidewalls comprises one or more thermochromic sidewalls; a switch assembly located in the housing; and an electrical connector extending from the housing, wherein the electrical connector is configured to place the switch assembly in electrical connection with a main bus at an electrical distribution panel; wherein, in response to a condition at the circuit breaker assembly causing a temperature of a respective thermochromic sidewall of the one or more thermochromic sidewalls to exceed a temperature threshold, the respective thermochromic sidewall is configured to provide an indication of the condition of the circuit breaker assembly.

Aspect 2. The assembly according to aspect 1, wherein at least a portion of the respective thermochromic sidewall is configured to transition between a first color and a second color based on the temperature of the respective thermochromic sidewall relative to the temperature threshold.

Aspect 3. The assembly according to aspect 2, wherein the respective thermochromic sidewall is the first color when the temperature is below the temperature threshold.

Aspect 4. The assembly according to aspects 2 or 3, wherein the respective thermochromic sidewall transitions from the first color to the second color in response to the temperature of the respective thermochromic sidewall exceeding the temperature threshold.

Aspect 5. The assembly according to any of the preceding aspects, wherein the one or more thermochromic sidewalls are arranged on the housing so as to be observable when the circuit breaker assembly is installed into the electrical distribution panel.

Aspect 6. The assembly according to any of the preceding aspects, wherein the condition indicated by the respective thermochromic sidewall is due to a temperature in an interior region of the circuit breaker assembly increasing from thermal convection of heat produced by one or more electrical components in the circuit breaker assembly.

Aspect 7. The assembly according to any of the preceding aspects, wherein the condition indicated by the respective thermochromic sidewall is an electrical fault in an electrical distribution system in electrical connection with the circuit breaker assembly.

Aspect 8. The assembly according to any of the preceding aspects, wherein the one or more thermochromic sidewalls are not directly contacting an electrical component generating heat in the circuit breaker assembly.

Aspect 9. The assembly according to any of the preceding aspects, wherein the plurality of sidewalls comprises a polymeric material.

Aspect 10. The assembly according to aspect 9, wherein the one or more thermochromic sidewalls further comprises: a thermochromic additive mixed with the polymeric material.

Aspect 11. The assembly according to any of the preceding aspects, wherein the housing comprises: a first housing member, and a second housing member.

Aspect 12. The assembly according to aspect 11, wherein the second housing member comprises the one or more thermochromic sidewalls.

Aspect 13. The assembly according to any of the preceding aspects, wherein the electrical connector comprises a plurality of electrical connectors, each electrical connector of the plurality of electrical connectors connecting the switch assembly to a respective phase at the electrical distribution panel.

Aspect 14. An electrical device comprising: a housing comprising: a plurality of sidewalls, wherein the plurality of sidewalls includes at least one thermally indicative sidewall; and a switch assembly comprising: one or more electrical connectors configured to place the switch assembly in electrical connection with a respective phase of a main bus of an electrical distribution panel; wherein, in response to a condition at the electrical device causing a temperature of the at least one thermally indicative sidewall to exceed a temperature threshold, the at least one thermally indicative sidewall is configured to provide an indication of the condition.

Aspect 15. The device according to aspect 14, wherein the at least one thermally indicative sidewall is arranged at the housing so as to be observable when the electrical device is installed into the electrical distribution panel; wherein the condition indicated by the at least one thermally indicative sidewall is due to a temperature in an interior region of the electrical device increasing from thermal convection of heat produced by one or more electrical components in the electrical device.

Aspect 16. The device according to aspects 14 or 15, wherein the indication comprises the at least one thermally indicative sidewall being a first color when the temperature is below the temperature threshold, and the at least one thermally indicative sidewall transitioning from the first color to a second color in response to the temperature of the at least one thermally indicative sidewall exceeding the temperature threshold.

Aspect 17. The device according to aspects 14, 15, or 16, wherein the indication further comprises the at least one thermally indicative sidewall expanding in response to the temperature of the at least one thermally indicative sidewall exceeding the temperature threshold.

Aspect 18. The device according to aspects 14, 15, 16, or 17, wherein the indication further comprises the at least one thermally indicative sidewall emitting a noise in response to the temperature of the at least one thermally indicative sidewall exceeding the temperature threshold.

Aspect 19. The device according to aspects 14, 15, 16, 17, or 18, wherein the condition indicated by the at least one thermally indicative sidewall is due to a temperature in an interior region of the electrical device increasing from thermal convection of heat produced by one or more components in the electrical device.

Aspect 20. The device according to aspects 14, 15, 16, 17, 18, or 19, wherein the at least one thermally indicative sidewall is not directly contacting an electrical component generating the heat in the electrical device.

It is to be understood that changes can be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A circuit breaker assembly comprising:
a housing comprising:
a plurality of sidewalls,
wherein the plurality of sidewalls comprises one or more thermochromic sidewalls;
a switch assembly located in the housing; and
an electrical connector extending from the housing,
wherein the electrical connector is configured to place the switch assembly in electrical connection with a main bus at an electrical distribution panel;
wherein, in response to a condition at the circuit breaker assembly causing a temperature of a respective thermochromic sidewall of the one or more thermochromic sidewalls to exceed a temperature threshold, the respective thermochromic sidewall is configured to provide an indication of the condition of the circuit breaker assembly.

2. The assembly according to claim 1, wherein at least a portion of the respective thermochromic sidewall is configured to transition between a first color and a second color based on the temperature of the respective thermochromic sidewall relative to the temperature threshold.

3. The assembly according to claim 2, wherein the respective thermochromic sidewall is the first color when the temperature is below the temperature threshold.

4. The assembly according to claim 3, wherein the respective thermochromic sidewall transitions from the first color to the second color in response to the temperature of the respective thermochromic sidewall exceeding the temperature threshold.

5. The assembly according to claim 1, wherein the one or more thermochromic sidewalls are arranged on the housing so as to be observable when the circuit breaker assembly is installed into the electrical distribution panel.

6. The assembly according to claim 1, wherein the condition indicated by the respective thermochromic sidewall is due to a temperature in an interior region of the circuit breaker assembly increasing from thermal convection of heat produced by one or more electrical components in the circuit breaker assembly.

7. The assembly according to claim 6, wherein the condition indicated by the respective thermochromic sidewall is an electrical fault in an electrical distribution system in electrical connection with the circuit breaker assembly.

8. The assembly according to claim 1, wherein the one or more thermochromic sidewalls are not directly contacting an electrical component generating heat in the circuit breaker assembly.

9. The assembly according to claim 1, wherein the plurality of sidewalls comprises a polymeric material.

10. The assembly according to claim 9, wherein the one or more thermochromic sidewalls further comprises:
a thermochromic additive mixed with the polymeric material.

11. The assembly according to claim 1, wherein the housing comprises:
a first housing member, and
a second housing member.

12. The assembly according to claim 11, wherein the second housing member comprises the one or more thermochromic sidewalls.

13. The assembly according to claim 1, wherein the electrical connector comprises a plurality of electrical connectors, each electrical connector of the plurality of electrical connectors connecting the switch assembly to a respective phase at the electrical distribution panel.

14. An electrical device comprising:
a housing comprising:
a plurality of sidewalls,
wherein the plurality of sidewalls includes at least one thermally indicative sidewall; and
a switch assembly comprising:
one or more electrical connectors configured to place the switch assembly in electrical connection with a respective phase of a main bus of an electrical distribution panel;
wherein, in response to a condition at the electrical device causing a temperature of the at least one thermally indicative sidewall to exceed a temperature threshold, the at least one thermally indicative sidewall is configured to provide an indication of the condition.

15. The device according to claim 14, wherein the at least one thermally indicative sidewall is arranged at the housing so as to be observable when the electrical device is installed into the electrical distribution panel;
wherein the condition indicated by the at least one thermally indicative sidewall is due to a temperature in an interior region of the electrical device increasing from thermal convection of heat produced by one or more electrical components in the electrical device.

16. The device according to claim 14, wherein the indication comprises the at least one thermally indicative sidewall being a first color when the temperature is below the temperature threshold, and the at least one thermally indicative sidewall transitioning from the first color to a second color in response to the temperature of the at least one thermally indicative sidewall exceeding the temperature threshold.

17. The device according to claim 16, wherein the indication further comprises the at least one thermally indicative sidewall expanding in response to the temperature of the at least one thermally indicative sidewall exceeding the temperature threshold.

18. The device according to claim 16, wherein the indication further comprises the at least one thermally indicative sidewall emitting a noise in response to the temperature of the at least one thermally indicative sidewall exceeding the temperature threshold.

19. The device according to claim 14, wherein the condition indicated by the at least one thermally indicative sidewall is due to a temperature in an interior region of the electrical device increasing from thermal convection of heat produced by one or more components in the electrical device.

20. The device according to claim 19, wherein the at least one thermally indicative sidewall is not directly contacting an electrical component generating the heat in the electrical device.

* * * * *